United States Patent [19]

Weeden, Jr.

[11] 3,781,573

[45] Dec. 25, 1973

[54] SOLID-STATE LONG-PERIOD TIMER

[75] Inventor: Otto P. Weeden, Jr., Phoenix, Ariz.

[73] Assignee: Honeywell Information Systems, Inc., Waltham, Mass.

[22] Filed: Sept. 5, 1972

[21] Appl. No.: 286,517

[52] U.S. Cl. .................. 307/293, 307/273, 307/291, 328/206, 328/207

[51] Int. Cl. .......................................... H03k 17/26

[58] Field of Search .................... 307/228, 234, 273, 307/293, 291; 328/206, 207, 55

[56] References Cited

UNITED STATES PATENTS

| | | | |
|---|---|---|---|
| 3,676,699 | 7/1972 | Warren | 307/273 |
| 3,509,367 | 4/1970 | Orsen | 307/228 |
| 3,555,305 | 1/1971 | Luczkowski | 307/228 |
| 3,576,496 | 4/1971 | Garagnon | 307/293 |
| 3,668,423 | 6/1972 | Couch | 307/293 |
| 3,714,587 | 1/1973 | Lindsey et al. | 307/273 |

*Primary Examiner*—Stanley D. Miller, Jr.
*Attorney*—Lloyd B. Guernsey et al.

[57] ABSTRACT

The solid-state circuit employs the combination of a retriggerable one-shot, a timing circuit and a master-slave flip-flop to build a basic timer. This timer can be used as a time-delay relay, a tone decoder, a pulse width detector or as a variety of other timing units which require accurate measurements of time durations.

10 Claims, 6 Drawing Figures

SOLID-STATE LONG-PERIOD TIMER

BACKGROUND OF THE INVENTION

This invention relates to a solid-state long-period timer and more particularly to a timer which uses a combination of a retriggerable one-shot, a timing circuit and a master-slave flip-flop to form a basic timer which can be used in a wide variety of applications requiring accurate measurement of time durations. This combination can be used to build a time-delay relay, a tone decoder, a pulse width detector or other timing units which can be used over a wide range of frequencies from several mega Hertz to less than 1 Hertz.

In many data processing systems, in radar, in data communication systems and many other electronic systems it is important that data or control signals be stored or delayed for varying periods of time. Many different types of prior art apparatus have been used for delaying or storing signals for relatively short periods of time. The prior art apparatus includes delay lines of various types, mechanical relays with built-in time delays and magnetic tape or disks which are used to store signals for retrieval at a later time. Delay lines have the disadvantage of severe attenuation of signals when relatively long time delays are required. Such delay lines are also bulky and relatively expensive to build. Mechanical relays provide relatively long time delays but have the disadvantage of being inaccurate and inconsistent in timing the duration of the time delays.

The present invention alleviates the disadvantages of the prior art apparatus by providing a solid-state timer which is compact, relatively inexpensive and provides accurate and consistent durations of time delays. The present invention also provides a wide range of time delays from a few nanoseconds ($10^{-9}$ secs.) to a delay of more than one minute by merely changing the value of the timing components in the apparatus.

It is, therefore, an object of this invention to provide a new and improved timer.

Another object of this invention is to provide a timer which produces a wide range of time delays.

Still another object of this invention is to provide a timer which produces accurate and consistent durations of time delays.

A further object of this invention is to provide a timer which develops pulses having a wide range of time durations.

A further object of this invention is to provide a timer which can be used as a time delay relay.

Still another object of this invention is to provide a timer which can be used as a time decoder.

Another object of this invention is to provide a timer which can be used as a pulse width detector.

SUMMARY OF THE INVENTION

The foregoing objects are achieved in the present invention by providing a new and improved timer which includes a retriggerable one-shot, a timing circuit and a master-slave flip-flop. The timer receives an input pulse and after a predetermined time delay delivers an output pulse. The duration of the time delay is determined by the value of the components in the timing circuit. To obtain a different time delay it is necessary only to change the value of the components in the timing circuit.

Other objects and advantages of this invention will become apparent from the following description when taken in connection with the accompanying drawings.

DESCRIPTION OF THE PREFERRED EMBODIMENT

Figure 1:
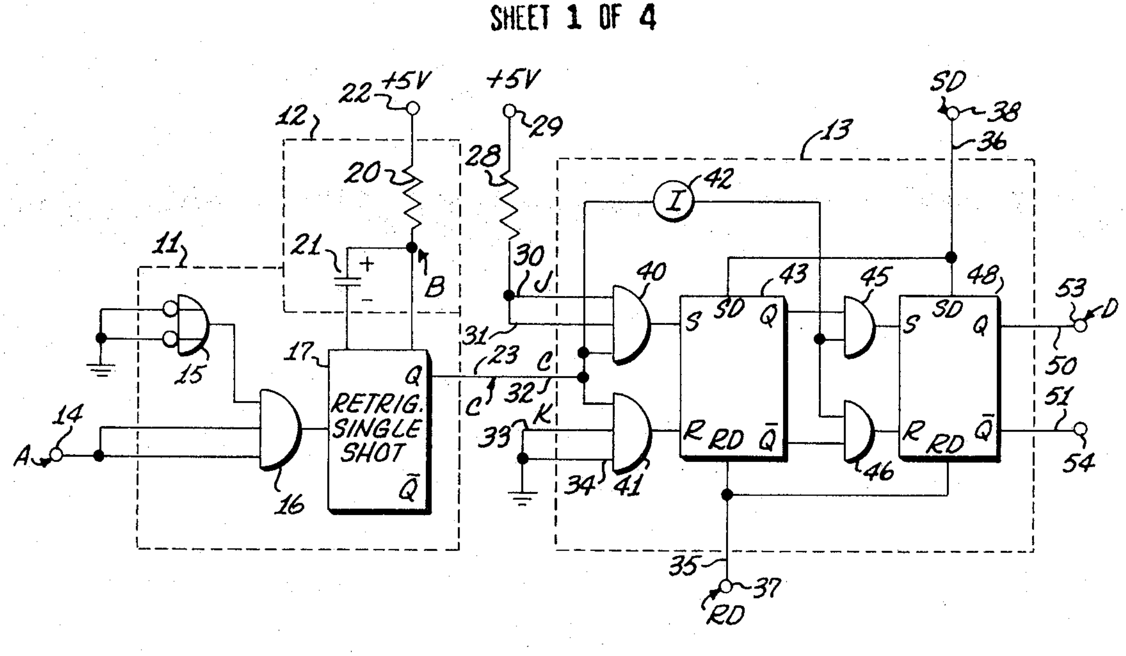
FIG. 1 is a schematic drawing of an embodiment of the present invention.

Referring more particularly to the drawings by the characters of reference, FIG. 1 discloses a basic timer which includes a retriggerable one-shot 11, a timing circuit 12 and a master-slave flip-flop 13. One such retriggerable one-shot which may be used is the 9601 manufactured by Fairchild and described in the booklet "Fairchild TTL Family." The retriggerable one-shot 11 includes a NOR-gate 15, an AND-gate 16 and a retriggerable single-shot 17. A retriggerable single-shot is a monostable multi-vibrator circuit that operates in two states, one a reset state and the other a set state. It transfers from its reset state in which it normally operates to a set state upon the application of a trigger signal thereto. The lead entering the left-hand side of the single-shot shown in FIG. 1 provides the set input signal. When the set input signal goes positive the single-shot is transferred to its set state. When a single input signal is received the single-shot stays in the set state for a predetermined period of time depending upon the values of components in the timing circuit 12 and will then automatically return to its reset state. Because the single-shot returns by itself to its reset state, no reset input is required. When a series of closely spaced set input signals are applied to the single-shot the single-shot transfers to its set state upon receipt of the first signal and remains in the set state for a predetermined period of time after the receipt of the last of these signals.

The AND-gates disclosed in FIG. 1 provides a logical operation of conjunction for binary one signals applied thereto. In the system disclosed the binary 1 is represented by a positive signal, the AND-gate provides a positive output signal representing a binary 1, when and only when, all of the input signals applied thereto are positive and represent binary 1's. The symbols identified by the reference numerals 16 and 45 represent AND-gates having 3 and 2 input leads respectively. Such AND-gates deliver a binary 1 output signal only when each of the input signals applied thereto are positive and represent a binary 1. The NOR logic signals are developed by NOR-gates which provide the NOR logical operation for negative signals applied thereto. The NOR-gate provides an output signal representing a binary 1, when any one or more of the input signals applied thereto represent binary 0's. When all of the input signals represent binary 1's, the output signal represents a binary 0. The symbol identified by reference numeral 15 represents a NOR-gate having two input leads.

Figure 3:
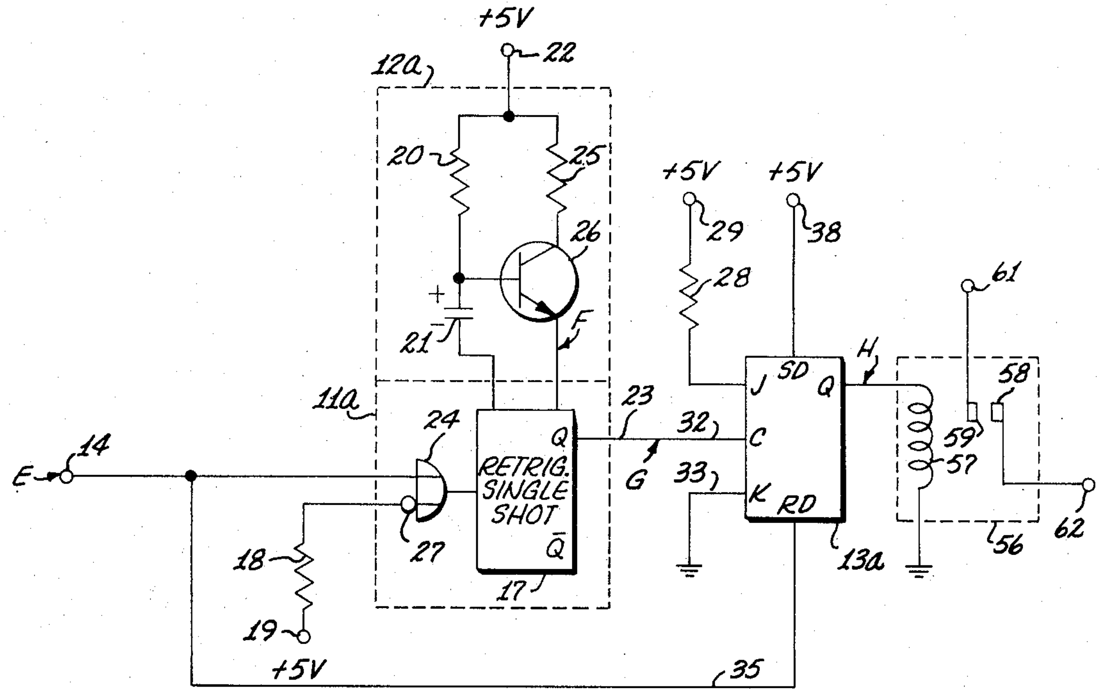
FIG. 3 illustrates another embodiment of the present invention.
Figure 5:
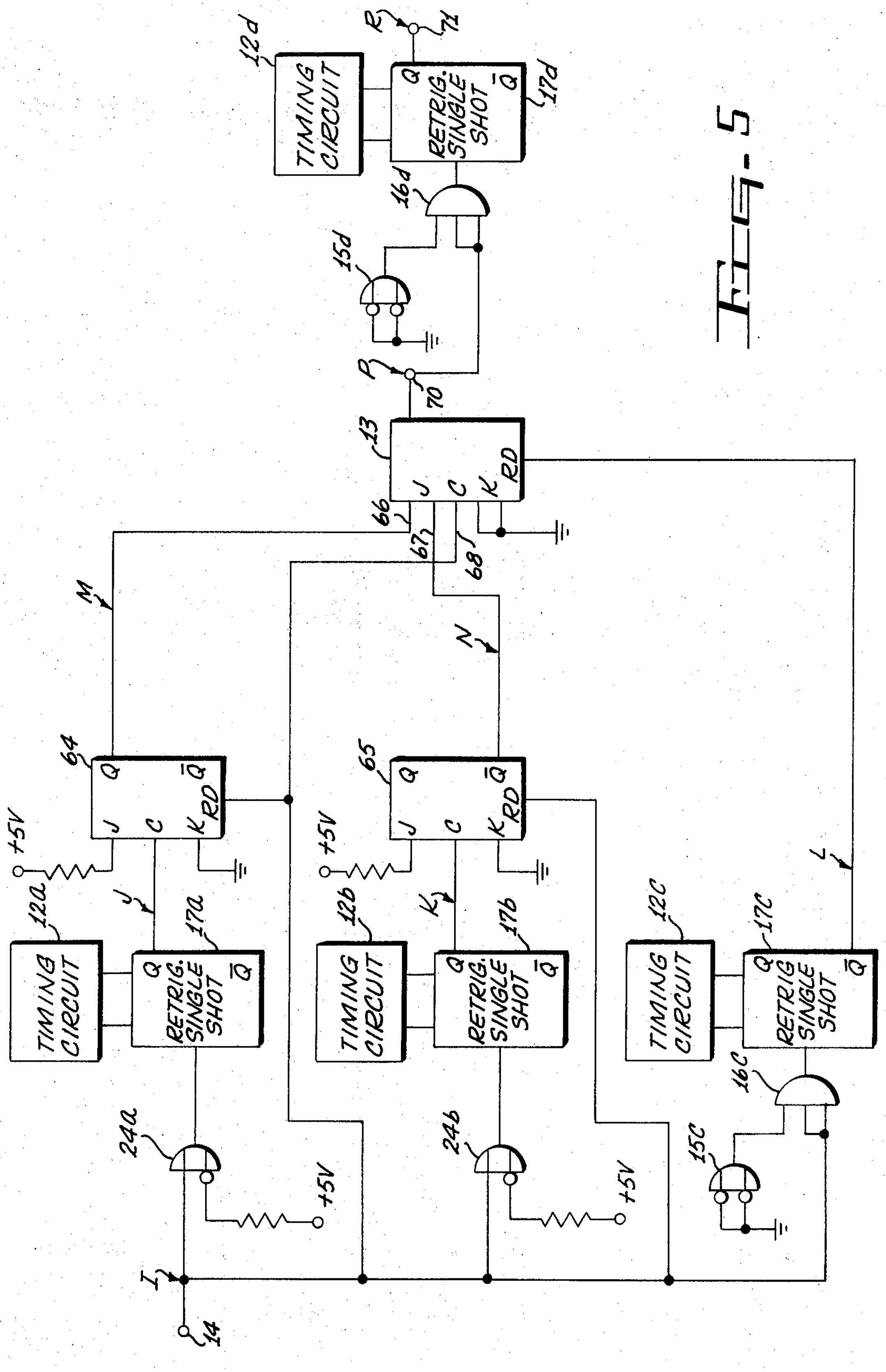
FIG. 5 is a schematic drawing of another embodiment of the present invention.

The master-slave flip-flops 13 which are shown in FIGS. 1, 3 and 5 are commercially available from several sources. One such master-slave flip-flop which may be used is the 7473 manufactured by Fairchild and described in the booklet "Fairchild Semiconductor" by Fairchild Semiconductor Corp., Mountainview, Calif. Since the operation of the master-slave flip-flop is relatively well known in the art it is believed unnecessary to describe all of the details of the operation of the master-slave flip-flop. Even though details will be eliminated a basic description of the master-slave flip-flop will be given to enable one skilled in the art to understand the environment in which the present invention is placed. Accordingly, the operation of the flip-flop 13 of FIG. 1 will be described in connection with the waveforms illustrated in FIG. 2.

In FIG. 1 the equivalent circuit of the master-slave flip-flop is shown to facilitate the explanation of the operation of the master-slave flip-flop. In FIGS. 3 and 5 the logic symbol for the master-slave flip-flop is shown. The master-slave flip-flop 13*a* of FIG. 3 includes a single J input lead and a single K input lead while the master-slave flip-flop of FIG. 5 includes two J leads and two K leads. Each master-slave flip-flop includes a pair of JK flip-flops, an inverter and four AND-gates. The JK flip-flop as the term is used in the description of the present invention, is a bistable device whose output has a function of its last input, such a flip-flop is shown and represented by the reference No. 43 in FIG. 1. This flip-flop is a 4-input, 2-output device having a set "S," reset "R," "SD," "RD" input leads and a Q and $\overline{Q}$ output leads. In this type of device, a binary 1 applied to the set (S) lead places the flip-flop into its set state in which condition there is a binary 1 at its Q output lead and a binary 0 at its $\overline{Q}$ output lead. Conversely, a binary 1 applied to its reset (R) lead places the flip-flop into the state in which there is a binary 1 at its $\overline{Q}$ lead and a binary 0 at its Q output lead. In the circuit shown in FIG. 1 a binary 1 is represented by a positive value of voltage and a binary 0 is represented by a value of voltage near ground potential. A negative voltage applied to the SD lead of the flip-flop sets the flip-flop irrespective of the voltages applied to the S and R input leads. A negative value of voltage applied to the RD input lead resets the JK flip-flop irrespective of any voltages applied to the S and R input leads.

The inverters disclosed in the circuit of FIG. 1 provide the logical operation of inversion for an input signal applied thereto. The inverter provides a positive output signal representing a binary 1 when the input signal represents a binary 0. Conversely, the inverter provides an output signal representing a binary 0 when the input signal represents a binary 1. In the master-slave flip-flop 13 of FIG. 1 the AND-gates 40 and 41 disclosed each have three input leads. Two of these input leads of gate 40 are connected to the "J" input leads and the third lead is connected to the "C" or clock input lead. Two of the input leads of gate 41 are connected to the "K" input leads and the third lead is connected to the "C" input lead. In other embodiments of the master-slave flip-flop AND-gates 40 and 41 each have two input leads. One of these input leads of gate 40 is connected to the J input leads and the other to the C input lead. The one lead of AND-gate 41 goes to the K input lead and the other goes to the C input lead. In still other embodiments of the master-slave flip-flop AND-gates 40 and 41 may each have four or more input leads. When an AND-gate has four input leads three of these leads are used for the J or K input leads and the fourth lead of each of the AND-gates is connected to the C input lead.

Figure 2:
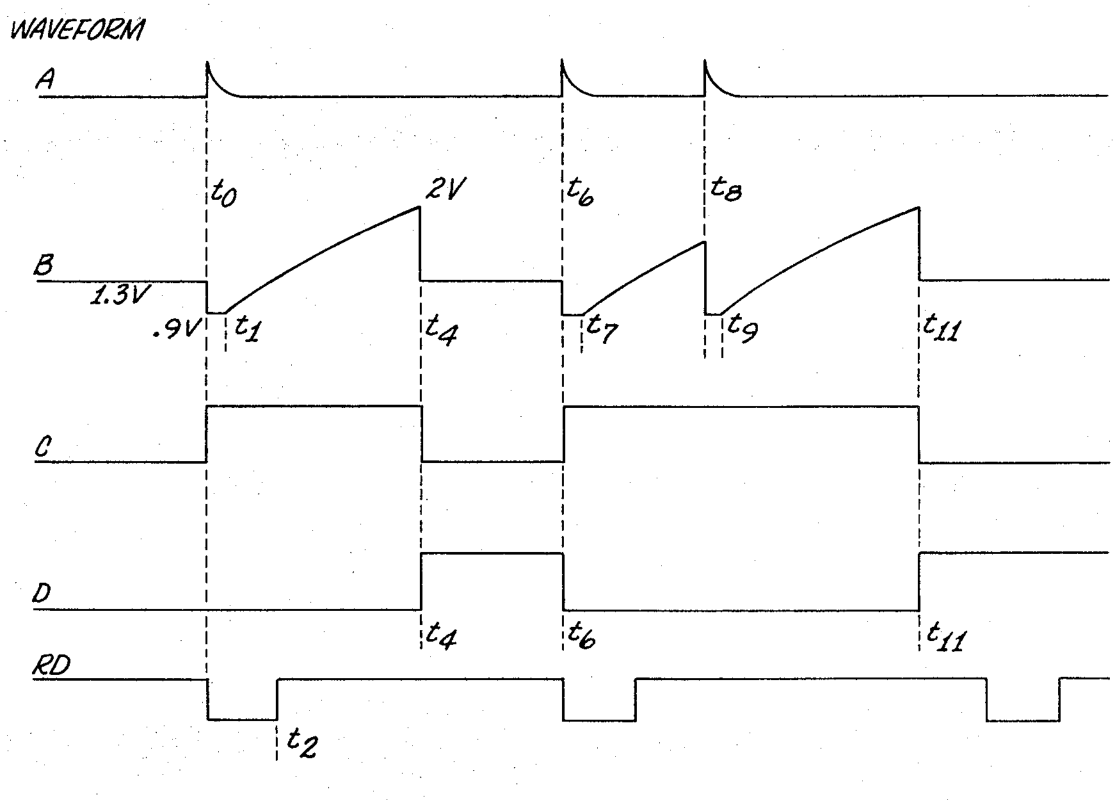
FIG. 2 illustrates waveforms which are useful in explaining the operation of the circuit shown in FIG. 1.

The operation of the timer of FIG. 1 will now be described in connection with the waveforms shown in FIG. 2. The input leads to the NOR-gate 15 of the retriggerable one-shot are connected to ground so that the output voltage from NOR-gate 15 is a positive voltage thereby enabling AND-gate 16. When gate 16 is enabled positive pulses applied to signal-input terminal 14 cause the retriggerable single-shot 17 to be set and cause the timer to provide pulses of a predetermined time duration at the signal-output terminal 53. Each of the pulses at terminal 14 causes the timer to provide a pulse having a predetermined interval of time unless another pulse is received at terminal 14 prior to the end of the timing period. For example, prior to time $t_0$ (FIG. 2) capacitor 21 in the timing circuit 12 is charged to the polarity shown in FIG. 1. The amplitude of the voltage on the upper plate of capacitor 21 is +1.3 volts as shown in waveform B. At time $t_0$ the pulse applied to input terminal 14 causes AND-gate 16 to provide a positive pulse to the single-shot 17. This positive pulse sets single-shot 17 thereby causing the single-shot to discharge capacitor 21 so that voltage on the upper plate is +0.9 volts. When the single-shot 17 is set the voltage at the Q output lead increases as shown in waveform C.

At time $t_0$ the positive voltage from the Q output lead of the retriggerable one-shot and the +5 volts at terminal 29 enable AND-gate 40 in the master-slave flip-flop 13 and cause the JK flip-flop 43 to be set. When the JK flip-flop 43 is set a positive voltage from the Q output lead is applied to one lead of AND-gate 45.

At time $t_1$ the capacitor 21 has discharged and the single-shot no longer provides a path for the capacitor to discharge. A current now flows from terminal 22 through resistor 20 to the upper plate of capacitor 21 causing the capacitor to charge. Capacitor 21 continues to charge until the voltage on the upper plate of the capacitor reaches a value of +2 volts at time $t_4$. At time $t_4$ the +2 volts on capacitor 21 causes the retriggerable single-shot 17 to be reset so that capacitor 21 discharges to +1.3 volts and the voltage at the Q output lead of the single-shot decreases to a low value of voltage as shown in waveform C. At time $t_4$ the positive voltage from the Q output lead of the single-shot decreases to a low value of voltage as shown in waveform C. At time $t_4$ the low value of voltage on the input lead 32 of the master-slave flip-flop 13 is inverted by inverter 42 and applied as a positive voltage to the lower lead of AND-gate 45 thereby enabling AND-gate 45 and providing a positive voltage to the S input lead of the flip-flop 48. This positive voltage of the S input lead sets flip-flop 48 so that a positive voltage is developed on the Q output lead 50 of flip-flop 48.

The time delay period is the time between $t_0$ and $t_4$. When another signal pulse is received before capacitor 21 charges to +2 volts the time delay period is extended as shown between times $t_6$ and $t_{11}$ of FIG. 2. For example, at time $t_6$ a pulse supplied to the input terminal 14 causes capacitor 21 in the timing circuit to discharge to +0.9 volts. At time $t_7$ the capacitor starts charging toward a +2 volts. However, at time $t_8$ another pulse on input terminal 14 causes the capacitor to discharge to +0.9 volts. At time $t_9$ the capacitor 21 again starts charging and continues to charge until the voltage across the capacitor is 2 volts as shown at time $t_{11}$ of waveform B. During the time between $t_6$ and $t_{11}$ the output voltage on terminal 53 is low as shown in waveform D of FIG. 2. At time $t_{11}$ the capacitor 21 has again charged to a +2 volts so that the voltage on Q output lead 23 of the single-shot drops causing the signal at output terminal 53 to increase as shown in waveform D. A negative pulse as shown in waveform RD of FIG. 2 is applied to the input terminal 37 thereby resetting the JK flip-flops 43 and 48 prior to the end of each of the timing periods.

The RC time constant of resistor 20 and capacitor 21 determine the duration of time delay period. Larger values of RC time provide larger periods of time delays. The maximum and minimum values of resistor 20 are determined by the minimum and maximum values of current required by single-shot 17. Typical upper and lower limits of the value of resistor 20 are 50,000 ohms and 5000 ohms. The maximum value of capacitor 21 is limited by the physical size of the capacitor. When a large value of RC is desired the circuit 12*a* of FIG. 3 may be used. The limits of the values of resistor 20 of FIG. 3 is beta times the value of resistor 25 where beta is the gain of transistor 26. Resistor 25 limits the current through single-shot 17 so the upper and lower limits of values of resistor 25 are typically 50,000 ohms and 5000 ohms. When the beta of transistor 26 is 100 the upper and lower limits of resistor 20 are now 5,000,000 ohms and 500,000 ohms. Thus, much larger values of the RC time constant may be obtained without using large capacitors.

Figure 4:
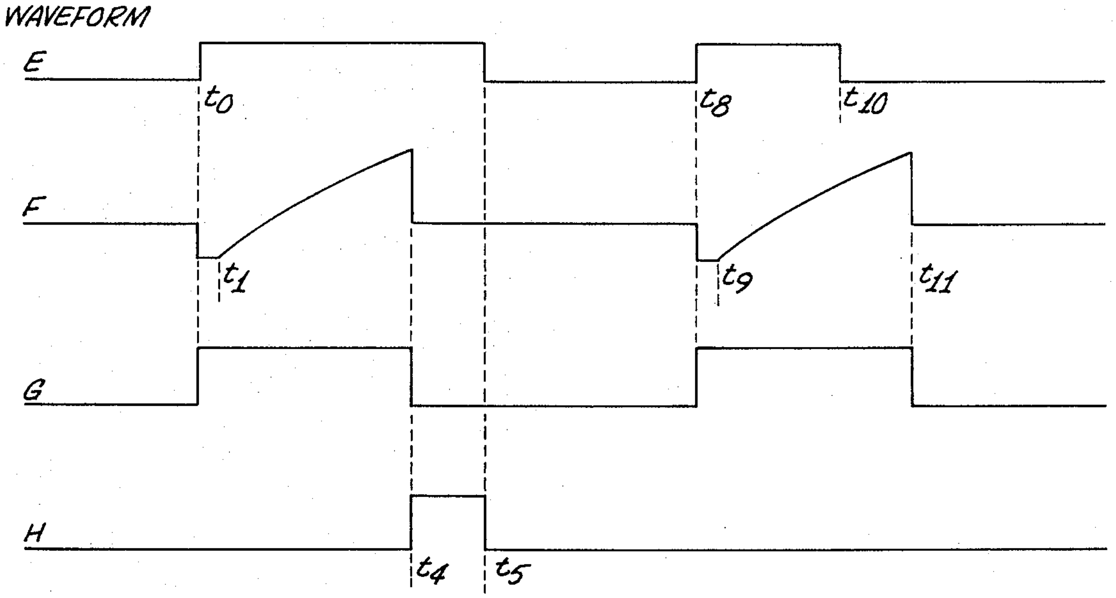
FIG. 4 illustrates waveforms which are useful in explaining the operation of the circuit shown in FIG. 3.

The time-delay relay shown in FIG. 3 includes a retriggerable one-shot 11*a*, a timing circuit 12*a*, a master-slave flip-flop 13*a* and a relay 56. The duration of the positive pulse on output lead 23 of the retriggerable single-shot is determined by the RC time constant of resistor 20 and capacitor 21. A +5 volts applied to terminal 19 is coupled through resistor 18 and inverter 27 to OR-gate 24 thereby providing a negative voltage to the lower input lead of gate 24. This negative voltage prevents noise signals from setting the single-shot. Signals from the upper input lead of OR-gate 24 are coupled to the retriggerable single-shot 17. Positive pulses applied to input terminal 14 which are longer than the timing period of circuit 12*a* cause the master-slave flip-flop 13*a* to provide a positive output pulse. As shown in waveform F of FIG. 4 the timing period of circuit 12*a* has a time duration from $t_0$ to $t_4$. At time $t_0$ the positive voltage of waveform E causes the retriggerable single-shot 11*a* to provide a positive signal on output lead 23. The duration of this positive signal is from time $t_0$ to time $t_4$ as shown in waveform G of FIG. 4. At time $t_4$ the negative going voltage of waveform G causes the master-slave flip-flop 13*a* to be set so that the voltage at the Q output lead is positive as shown in waveform H of FIG. 4. At time $t_5$ the negative going voltage of waveform E causes the master-slave flip-flop 13*a* to be reset so the voltage on the Q output lead decreases as shown in waveform H. During this period from time $t_4$ to time $t_5$ the positive voltage at the Q output lead of flip-flop 13a provides a current through the coil 57 so that the relay contacts 58 and 59 are closed. Relay 56 can be used to control current to a load which is not shown in FIG. 3. When the time duration of the input waveform E is less than the time between $t_0$ and $t_4$ the master-slave flip-flop is not set. As shown at time $t_{10}$ of FIG. 4 the negative going voltage of waveform E applied to input lead 35 of the master-slave flip-flop causes the JK flip-flops in the master-slave flip-flop to be reset so that there is no output voltage on the Q output lead of master-slave flip-flop 13*a*.

Figure 6:
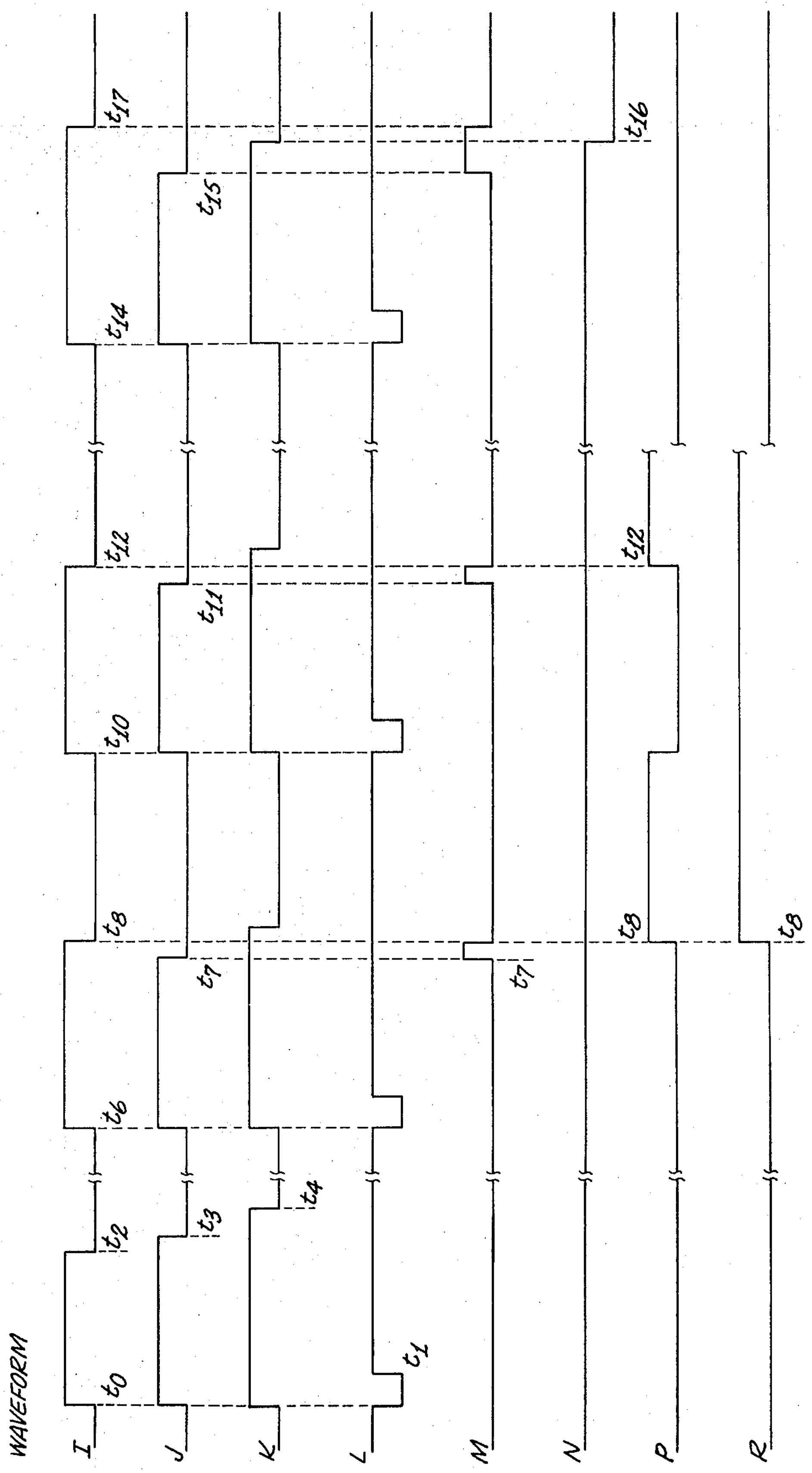
FIG. 6 illustrates waveforms which are useful in explaining the operation of the circuit shown in FIG. 5.

The digital tone detector disclosed in FIG. 5 can quickly detect a signal whose frequency falls within a predetermined pass band. This circuit has a fast response and produces an output signal when only one cycle of the predetermined duration of pulses is received. This circuit can be used to detect pulse rates from less than one pulse per second up to several mega Hertz by proper selection of the components of the timing circuits. The input waveform I of FIG. 6 illustrates pulses which are too narrow to be detected, pulses which have the proper time duration to be detected and pulses which have a time duration which is too long to be detected. The short duration pulses are from time $t_0$ to time $t_4$ of waveform 6. The pulses which have the right time duration to be detected are shown between times $t_6$ and $t_{12}$ and the pulses which have a time duration which is too long are shown between time $t_{14}$ and time $t_{17}$.

The circuit of FIG. 5 includes four single-shots 17*a*–17*d* and three master-slave flip-flops 13, 64 and 65. Single-shot 17*a* develops pulses having a time duration slightly shorter than the duration of the desired pulses. Single-shot 17*b* develops pulses having a time duration slightly longer than the duration of the desired pulses. Single-shot 17*c* provides a reset pulse for flip-flop 13 each time a pulse is received at input terminal 14.

The pulse of waveform I at time $t_0$ causes each of the retriggerable single-shots 17*a*, 17*b* and 17*c* to provide a positive pulse on the respective Q output leads. The duration of the pulse produced by the retriggerable single-shot 17*a* is from time $t_0$ to time $t_3$ and the duration of the pulse produced by retriggerable single-shot 17*b* is from time $t_0$ to time $t_4$. These pulses are applied to the master-slave flip-flops 64 and 65 respectively; however, at time $t_2$ the negative going voltage of waveform I causes flip-flops 64 and 64 to each be reset so that no output pulses are provided on the Q output leads of flip-flops 64 and 65. A positive voltage is produced at the $\overline{Q}$ output lead of flip-flop 65. At time $t_2$ the negative going voltage on the C input lead of master-slave flip-flop 13 and the positive voltage on the input lead 67 would cause master-slave flip-flop 13 to be set if a positive voltage were also applied to input lead 66. Since the voltage on input lead 66 is not positive the flip-flop 13 will not be set and the voltage at the output terminal 70 remains low. When the output voltage on terminal 70 remains low the retriggerable single-shot 17*d* is not set and the voltage on the output terminal 71 remains low.

Between times $t_6$ and $t_8$ of waveform I the duration is correct to cause the circuit of FIG. 5 to provide an output signal. At time $t_6$ input waveform I sets the retriggerable single-shots 17*a*, 17*b* and 17*c* so that a positive output voltage is provided on the Q output leads of these single-shots. At time $t_7$ the decreasing voltage on the C input lead of master-slave flip-flop 64 sets the flip-flop 64 so that a positive voltage is provided at the Q output lead of flip-flop 64. Since the timing circuit 12*b* provides a longer time duration the master-slave flip-flop 65 is not set and the $\overline{Q}$ output voltage remains high. Thus, at time $t_7$ the voltage on input lead 66 and voltage on input lead 67 are both high. At time $t_8$ the decreasing voltage of waveform I applied to the input lead 68 causes the master-slave flip-flop 13 is applied to the input lead of AND-gate **16*d* causing the retriggerable single-shot 17*d* to be set thereby providing a positive output voltage at output terminal 71. The timing period provided by timing circuit 12*d* is greater than the period between pulses when signal waveform I falls within the band pass. Thus, the output voltage at terminal 71 remains high as long as the pulses within the band pass are applied to the input terminal 14 of the circuit in FIG. 5**.

When the frequency of the pulses applied to signal input terminal 14 is lower than the band pass frequency the time duration of the pulses increases as shown between time $t_{14}$ and $t_{17}$ of waveform I. At time $t_{14}$ the input waveform sets the retriggerable single-shots **17*a*, 17*b* and 17*c* so that a positive voltage from the Q output lead is applied to the C input lead of the master-slave flip-flops 64 and 65. At time $t_{15}$ the decreasing voltage of waveform J causes the master-slave flip-flop 64 to be set and at time $t_{16}$ the decreasing voltage of waveform K causes the master-slave flip-flop 65 to be set. When master-slave flip-flop 64 is set a positive voltage is applied to input lead 66 of the master-slave flip-flop 13, but a low value of voltage is applied to input lead 67 from the master-slave flip-flop 65. The low value of voltage on lead 67 prevents the master-slave flip-flop 13 from being set so that there is no positive output voltage on the Q output lead of master-slave flip-flop 13 and the voltage on the output terminal 71** remains low.

While the principles of the invention have now been made clear in an illustrative embodiment, there will be many obvious modifications of the structure, proportions, materials and components without departing from those principles. The appended claims are intended to cover any such modifications.

What is claimed is:

1. A solid-state timer comprising:

a retriggerable one-shot having an input lead and an output lead;

a timing circuit, said timing circuit being connected to said one-shot;

a master-slave flip-flop having first, second, third and fourth input leads and an output lead;

first and second reference potentials, said first potential being coupled to said first input lead of said flip-flop, said second input lead of said flip-flop being connected to said output lead of said one-shot, said third input lead of said flip-flop being connected to said second potential; and first and second signal-input terminals, said first input terminal being connected to said input lead of said one-shot, said second input terminal being connected to said fourth input lead of said flip-flop.

2. A timer as defined in claim 1 wherein said timing circuit includes:

a transistor having a base, a collector and an emitter, said emitter of said transistor being connected to said one-shot;

first and second resistors, said first resistor being connected between said first potential and said base of said transistor, said second resistor being connected between said first potential and said collector of said transistor; and a capacitor, said capacitor being connected between said one-shot and said base of said transistor.

3. A timer comprising:

a retriggerable one-shot having an input lead and an output lead;

a timing circuit, said timing circuit being connected to said one-shot;

a master-slave flip-flop having first, second, third and fourth input leads and an output lead, said second input of said flip-flop being connected to said output lead of said one-shot;

first and second reference potentials, said first potential being coupled to said first input lead of said flip-flop, said third input lead of said flip-flop being connected to said second potential;

a signal-input terminal, said input terminal being connected to said input lead of said one-shot and to said fourth input lead of said flip-flop;

a relay having a coil and first and second contacts, said coil of said relay being connected between said second potential and said output lead of said flip-flop; and first and second output terminals, said first output terminal being connected to said first contact of said relay, said second output terminal being connected to said second contact of said relay.

4. A timer as defined in claim 3 wherein said timing circuit includes:

a transistor having a base, a collector and an emitter, said emitter of said transistor being connected to said one-shot;

first and second resistors, said first resistor being connected between said first potential and said base of said transistor, said second resistor being connected between said first potential and said collector of said transistor; and a capacitor, said capacitor being connected between said one-shot and said base of said transistor.

5. A timer comprising:

a first retriggerable one-shot having an input lead and and output lead;

a first timing circuit, said first timing circuit being connected to said first one-shot;

first and second master-slave flip-flops each having first, second, third and fourth input leads and an output lead, said second input lead of said first flip-flop being connected to said output lead of said one-shot;

first and second reference potentials, said first potential being coupled to said first input lead of said first flip-flop, said second potential being connected to said third input lead of said first flip-flop, said first input lead of said second flip-flop being connected to said output lead of said first flip-flop, said third input lead of said second flip-flop being connected to said second potential;

a signal-input terminal, said input terminal being connected to said input lead of said one-shot and to said fourth input lead of said first flip-flop, said second input lead of said second flip-flop being connected to said input terminal; and means for coupling said input terminal to said fourth input lead of said second flip-flop.

6. A timer as defined in claim 5 including:

a second retriggerable one-shot having an input lead and an output lead, said input lead of said second one-shot being connected to said output lead of said second flip-flop;

a second timing circuit, said second timing circuit being connected to said second one-shot; and an output terminal, said output terminal being connected to said output lead of said second one-shot.

7. A timer comprising:

first and second retriggerable one-shots each having an input lead and an output lead;

first and second timing circuits, said first timing circuit being connected to said first one-shot, said second timing circuit being connected to said second one-shot;

first and second master-slave flip-flops each having first, second, third and fourth input leads and first and second output leads, said second input lead of said first flip-flop being connected to said output lead of said first one-shot, said second input lead of said second flip-flop being connected to said output lead of said second one-shot;

first and second reference potentials, said first potential being coupled to said first input leads of said first and said second flip-flops, said second potential being connected to said third input leads of said first and said second flip-flops;

a signal-input terminal, said input terminal being connected to said input leads of said first and said second one-shots, and to said fourth input leads of said first and said second flip-flops;

a third master-slave flip-flop having first, second, third, fourth, fifth and sixth input leads and an output lead, said first input lead of said third flip-flop being connected to said first output lead of said first flip-flop, said second input lead of said third flip-flop being connected to said input terminal, said second potential being connected to said third and said sixth input leads of said third flip-flop, said fifth input lead of said third flip-flop being connected to said second output lead of said second flip-flop; and means for coupling said input terminal to said fourth input lead of said third flip-flop.

8. A timer as defined in claim 7 including:

a third retriggerable one-shot having an input lead and an output lead, said input lead of said third one-shot being connected to said output lead of said third flip-flop;

a third timing circuit, said third timing circuit being connected to said third one-shot; and an output terminal, said output terminal being connected to said output lead of said third one-shot.

9. A timer as defined in claim 7 wherein said means for coupling includes:

a fourth retriggerable one-shot having an input lead and an output lead, and first and second output leads, said input lead of said fourth one-shot being connected to said input terminal;

a fourth timing circuit, said fourth timing circuit being connected to said fourth one-shot, said second output lead of said fourth one-shot being connected to said fourth input lead of said third flip-flop.

10. A timer as defined in claim 7 including:

third and fourth retriggerable one-shots, each having an input lead and first and second output leads, said input lead of said third one-shot being connected to said output lead of said third flip-flop, said input lead of said fourth one-shot being connected to said input terminal, said second output lead of said fourth one-shot being connected to said fourth input lead of said third flip-flop;

third and fourth timing circuits, said third timing circuit being connected to said third one-shot, said fourth timing circuit being connected to said fourth one-shot; and an output terminal, said output terminal being connected to said first output lead of said third one-shot.

* * * * *